United States Patent [19]

Britt et al.

[11] 4,401,050

[45] Aug. 30, 1983

[54] PHOSPHORESCENT ESCAPE ROUTE INDICATOR

[76] Inventors: Laurence D. Britt, 12059 Old Forge Rd., Waynesboro, Pa. 17268; Richard G. Britt, P.O. Box 3434, Peabody, Mass. 01960

[21] Appl. No.: 306,970

[22] Filed: Sep. 30, 1981

Related U.S. Application Data

[63] Continuation-in-part of Ser. No. 271,618, Jun. 8, 1981, abandoned.

[51] Int. Cl.[3] .......................... G01B 21/20; E04H 6/42

[52] U.S. Cl. .......................... 116/205; 40/542; 40/570; 52/174; 116/DIG. 14; 116/2; 250/462.1

[58] Field of Search ............. 116/205, DIG. 14, 63 R; 52/38, 105, 174; 250/462; 40/570, 542; 340/517, 584

[56] References Cited

U.S. PATENT DOCUMENTS

| | | | |
|---|---|---|---|
| 259,544 | 6/1882 | Howard | 52/174 |
| 1,944,276 | 1/1934 | Schepmoes | 40/570 |
| 2,085,807 | 7/1937 | Lindsey | 340/517 |
| 2,169,657 | 8/1939 | Millson | 40/105 X |
| 2,329,527 | 9/1943 | Golub | 116/DIG. 14 |
| 2,341,583 | 2/1944 | Tuve | 250/462 |
| 2,430,534 | 11/1947 | Rodli | 116/DIG. 14 |
| 2,480,584 | 8/1949 | Kohlhauer et al. | 250/462 X |
| 2,632,266 | 3/1953 | Sellwood | 116/205 |
| 3,409,770 | 11/1968 | Clapham, Jr. | 250/462 X |
| 3,411,978 | 11/1968 | Frohbach et al. | 116/DIG. 14 |
| 3,591,941 | 7/1971 | Jaffe, Jr. | 40/570 X |
| 3,665,626 | 5/1972 | Lund et al. | 40/570 |
| 4,016,450 | 4/1977 | Balekjian | 250/462 X |
| 4,074,225 | 2/1978 | Vandeweghe | 340/577 |
| 4,090,464 | 5/1978 | Bishopp et al. | 116/63 R |

FOREIGN PATENT DOCUMENTS

| | | | |
|---|---|---|---|
| 874554 | 7/1968 | Canada | 116/205 |

*Primary Examiner*—Daniel M. Yasich
*Attorney, Agent, or Firm*—Irving M. Kriegsman

[57] ABSTRACT

A phosphorescent escape route indicator having at least one protruding indicia formed within or attached to a sheet of material. The protruding indicia has incorporated therewith a phosphorescent substance capable of emitting a glow in the absence of light. An adhesive formed as part of the sheet is utilized to apply the indicator to the surface of walls or stairways thereby aiding in delineating escape routes or access routes to emergency equipment during time of emergency.

4 Claims, 8 Drawing Figures

PHOSPHORESCENT ESCAPE ROUTE INDICATOR

CROSS REFERENCE TO RELATED APPLICATIONS

This application is a continuation-in-part of U.S. patent application Ser. No. 271,618, filed on June 8, 1981, now abandoned in the names of Laurence D. Britt and Richard G. Britt.

BACKGROUND OF THE INVENTION

This invention relates generally to direction indicators, and, more particularly, to a phosphorescent indicator for use in effectively delineating a route which can be followed by a person in complete darkness and/or if, for one reason or another, the person's vision is impaired.

Many of today's new buildings are constructed either in whole or in part without incorporating therein the use of natural light sources. In other words, these buildings are designed with substantially no windows. Therefore artificial lighting provides the only means of illumination within such buildings.

Unfortunately, in the event of an emergency in which the artifical lighting fails or in buildings having natural light in which the emergency occurs during nightime, the only source of illumination is in the form of emergency lights. The emergency lights, which generally contain their own power source, in many instances fail to provide adequate illumination as well as being expensive to install and maintain. In addition, numerous situations have arisen in which the emergency lights have failed to operate thereby leaving distressed occupants in complete darkness while searching for exits and emergency equipment. Even in instances in which emergency lights have remained operational, heavy smoke conditions generally render the emergency lights virtually ineffective.

It is therefore of utmost importance to the safety of building occupants as well as for general buildings protections to provide with the building an aid which is not only operational during building evacuation but which also does not rely upon a power source for its effectiveness. In addition, this aid must be cost efficient so as to be readily useable within substantially all types of buildings or homes, that is, it must be (1) economical to produce, (2) able to withstand substantial abuse, and (3) simple to install, replace and/or remove.

In U.S. Pat. No. 3,001,306 to W. B. Wilkinson there are disclosed selectively attachable index tabs which are formed on a length of tape. In U.S. Pat. No. 3,506,528 to J. I. Dean there is disclosed a composite contrast color embossed display on a backing in the form of an adhesive strip and in U.S. Pat. No. 3,973,342 there is disclosed a reflector plate having a raised front surface. Other known prior art includes U.S. Pat. No. 3,131,495 to E. K. Stodola; U.S. Pat. No. 4,005,538 to C. F. Tung; U.S. Pat. No. 4,176,484 to J. M. Tervis; and U.S. Pat. No. 4,246,709 to F. K. A. Selleslags.

SUMMARY OF THE INVENTION

The instant invention overcomes the problems encountered in the past and as set forth in detail hereinabove by providing a phosphorescent and tactile escape route indicator which can be readily incorporated within existing or newly constructed buildings. In addition, the direction indicator of this invention can be utilized for a plurality of other applications in which it is necessary to define specific routes or directions during darkness.

The escape route indicator of this invention in its preferred embodiment, although not limited thereto, is formed of a sheet of material, preferably in tape form, having formed thereon protruding direction indicia. The indicia incorporate therein a phosphorescent material capable of emitting a glow immediately after the loss of artifical light thereby allowing the indicia to be readily seen or felt in darkness. The configuration of the indicia may vary in accordance with its preferred use, however, indicia in the form of an arrow or an arrow head generally provides adequate directional information.

As stated hereinabove it is preferred that the indicia be raised with respect to the surface of the tape, preferably through an embossing or vacuum forming technique performed during the manufacture of the indicator of this invention and by being formed separate from the tape and then attached thereto. The protruding indicia allows for the indicia to be felt even after the phosphorescent glow disappears.

The tape may be made of a plastic or mylar material which is transparent or translucent. In this manner, the phosphorescent material may be applied to the back surface of the indicia and be visible therethrough thereby substantially increasing the life expectancy of the indicator even though the tape is handled and/or cleaned during its usage. An adhesive backing is applied to the back surface of the tape in areas other than where the indicia protrude therefrom so as to enable the indicator to be readily affixed at any desired location in a building, such as, for example, the walls thereof.

By placing the phosphorescent indicator of this invention along escape route walls slightly above the floors and stairways, building personnel who find it necessary to evacuate the building can either walk or crawl therefrom. In fact, even during normal building use, the indicator of this invention aids in fire and emergency evacuation planning by clearly marking evacuation routes thereby allowing fire and safety personnel to easily orient workers. Furthermore, utilization of the present invention encourages personnel to use specifically designated evacuation routes during drills, allows visitors to the building unfamiliar with escape routes to quickly orient themselves, and, during actual emergency conditions, aids rescue personnel in moving from one area to another in search of trapped victims by providing reference markers which can be seen and/or felt.

In addition to the preferred embodiment of this invention described hereinabove, alternate embodiments of this invention may include, for example, separate indicia (in non-tape form) which may be individually placed within a building demarking particular routes of interest. These routes of interest may not only include escape routes, but also routes necessary to locate emergency equipment such as fire extinquishers or the like.

It is therefore an object of this invention to provide an indicator which is capable of operational use in periods of darkness by not only providing a visual but also a feelable indication of direction.

It is another object of this invention to provide an indicator which relies upon a phosphorescent material for illumination during periods of darkness.

It is a further object of this invention to provide a phosphorescent indicator which can be easily installed, removed or changed.

It is still another object of this invention to provide a phosphorescent indicator which is available in tape form.

It is still a further object of this invention to provide a phosphorescent indicator which can be readily used in the identification of escape routes within buildings or homes or military installations during periods of emergencies as well as during periods of normal use.

It is still another object of this invention to provide a phosphorescent escape route indicator which allows for the use of emergency lights to be concentrated in the most productive areas.

It is still a further object of this invention to provide a phosphorescent indicator which can be easily incorporated within new or existing buildings.

It is still a further object of this invention to provide a method of producing a phosphorescent indicator.

It is still a further object of this invention to provide a phosphorescent indicator which is economical to produce and which utilizes conventional, currently available components in the manufacture thereof.

It is still another object of this invention to use phosphorescent tape as a lower cost alternative to exit signs in buildings.

For a better understanding of the present invention, together with other aid further objects thereof, reference is made to the following description taken in conjunction with the accompanying drawings and its scope will be pointed out in the appended claims.

DETAILED DESCRIPTION OF THE DRAWINGS

DETAILED DESCRIPTION OF THE PREFERRED EMBODIMENTS

Figures 1, 2, 3, 4, 5, 6:
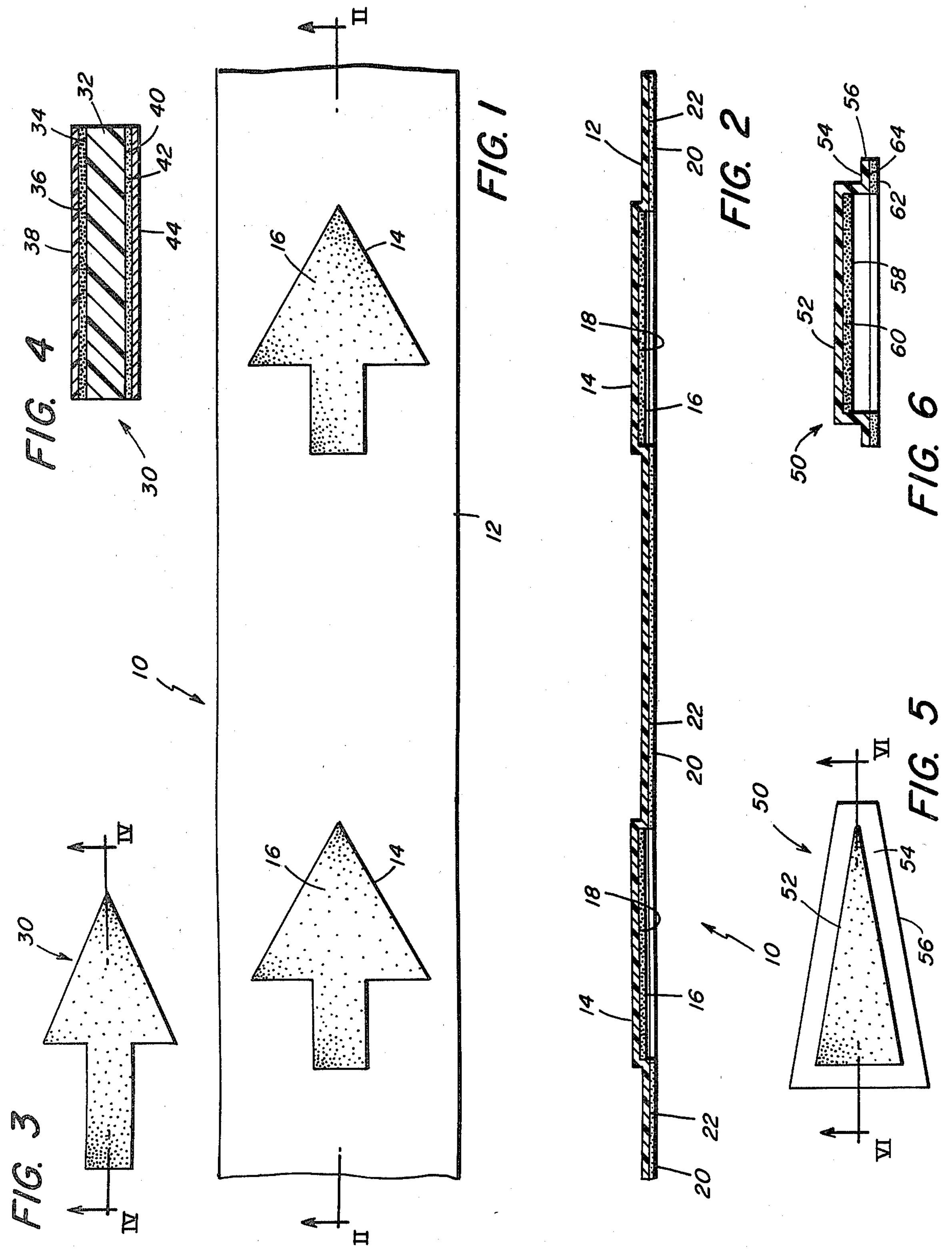
FIG. 1 is a plan view of the phosphorescent escape route indicator of this invention.
FIG. 2 is a cross-sectional view of the phosphorescent escape route indicator of this invention taken along line II—II of FIG. 1.
FIG. 3 is a plan view of an alternate embodiment of the phosphorescent escape route indicator of this invention.
FIG. 4 is a cross-sectional view of the alternate embodiment of the phosphorescent escape route indicator of this invention taken along line IV—IV of FIG. 3.
FIG. 5 is a plan view of another alternate embodiment of the phosphorescent escape route indicator of this invention.
FIG. 6 is a cross-sectional view of the other alternate embodiment of the phosphorescent escape route indicator of this invention taken along line VI—VI of FIG. 5.

Reference is now made to FIGS. 1 and 2 of the drawings which clearly depict the phosphorescent escape route indicator 10 of this invention in its preferred form. It should, however, be realized that indicator 10 is not limited to the embodiment set forth in FIGS. 1 and 2 of the drawings, and, therefore the description set forth below will also include alternate, with examples of alternate embodiments being embodiments of the invention, with examples of alternate embodiments being illustrated in FIGS. 2–6.

As shown in FIGS. 1 and 2, indicator 10 is made up of an elongated sheet of material 12, preferably made of plastic or mylar, which is capable of being wound upon a roll (not shown) from which indicator 10 can be dispensed. The sheet of material 12 is of any suitable length and width, with a width of, for example, approximately 2 inches being readily acceptable within the confines of this invention. Although the thickness of sheet 12 may vary within the scope of this invention it would be noted that sheet 12 must be of sufficient thickness to provide sufficient rigidity so that a plurality of suitable indicia 14 may protrude or project therefrom. A conventional embossing or vacuum forming technique may be utilized for the purpose of raising indicia 14 above the level of sheet 12, however, any other technique which produces the equivalent result may be utilized with this invention.

By having indicia 14 in raised form as clearly illustrated in FIG. 2 of the drawings, indicia 14 may be distinguished from the remaining portion of sheet 12 by merely running ones fingers over the surface of sheet 12. In order to allow indicia 14 to be visually observable in emergency conditions encountered during darkness, it is necessary to treat indicia 14 with a material capable of emitting a glow without the incorporation therein of a power source. Such a material may be in the form of any commercially available phosphorescent substance 16 which is applied to the back surface 18 of indicia 14. Therefore, it is necessary to make sheet 12 of a material which is either transparent or translucent in order to be able to clearly observe the phosphorescent quality of indicia 14. By applying phophorescent substance 16 to the back surface of indicia 14 the phosphorescent indicator 10 of this invention may be cleaned and frequently touched without adversely affecting the condition of the phosphorescent substance 16. Consequently, indicator 10 has a virtually limitless lifetime.

Although phosphorescent indicator 10 of this invention may be secured in its desired position by external securing means (not shown) it is extremely practical to incorporate within indicator 10 a self-adhering substance in the form of a pressure sensitive adhesive 20. Adhesive 20 is applied to the back surface 22 of sheet 12 which does not include the phosphorescent indicia 14.

Since the phosphorescent substance 16 is not applied to the outer surface of indicia 14, sheet 12 may be wrapped upon itself in a conventional roll form without the application of a protective covering on the adhesive. It is, however, possible, if desired, to protect adhesive 20 by a coextensive cover material adapted to be stripped away and discarded prior to use of indicator 10 of this invention. Such a cover material may, in fact, even be necessary in other embodiments of this invention as described hereinbelow with respect to FIGS. 3–6 of the drawings.

Although indicia 14 is illustrated in the drawings as being preferably in the form of an arrow or arrow head, it should be realized that indicia 14 may incorporate any desired configuration conforming to the intended use of this invention. Therefore, since this invention finds its primary application in delineating routes in times of emergency or emergency training, it is preferable that indicia 14 be so configured as to be representative of direction.

Still referring to FIGS. 1 and 2 of the drawing, and for purposes of fully appreciating this invention, set forth hereinbelow is a review of the steps necessary to produce the phosphorescent indicator 10 of this invention. These steps include:

(1) providing a transparent or translucent sheet of material 12 in a desired length and width;

(2) forming (preferably by an embossing technique) within sheet 12 a plurality of projecting or protruding indicia 14 representative of direction (preferably in the form of arrows or arrowheads);

(3) Masking the bottom surface of sheet 12 so as to leave the bottom surface of indicia 14 exposed;

(4) applying a phosphorescent substance to the bottom surface of indicia 14;

(5) masking the bottom surface of indicia 14 so as to leave the remaining bottom surface of sheet 12 exposed; and (6) applying a pressure sensitive adhesive coating to the remaining exposed bottom surface of sheet 12.

By providing a phosphorescent indicator 10 as described hereinabove in tape form, indicator 10 is economically and easily incorporated within a building which requires safe evacuation of the occupants during periods of darkness. Indicator 10 is preferably applied to walls (although not limited thereto) along as escape route at a desirable height above the floors and stairways, such as, for example, 28 inches. The phosphorescent indicia 14 emits a glow immediately after loss of artificial light thereby allowing the directional indicia 14 to be clearly visible for at least 4 to 5 minutes. Even thereafter a dim glow would be apparent, however, the protruding indicia could also be felt in the event of complete lack of phosphorescence. Occupants would therefore easily walk or crawl from the building in virtual safety. In addition, phosphorescent indicator 10 of this invention, because of its novel design, would not be destroyed by cleaning or constant touching thereby rendering it virtually indestructable.

Although the above description clearly defines the preferred embodiment of phosphorescent indicator 10 of this invention, this invention is capable of encompassing other embodiments. Reference is now made to FIGS. 3–6 of the drawings which show alternate embodiments, all within the scope of this invention. For example, FIGS. 3 and 4 illustrate an individual phosphorescent indicator 30 which may be utilized in the same manner as set forth with respect to indicator 10.

Phosphorescent indicator 30 is made of a sheet 32 of a preselected thickness such that it can be easily felt when applied to the surface of, for example, a wall. Applied to the top surface 34 of sheet 32 is a phosphorescent substance 36 and a protective coating or sheet 38 of transparent or translucent material. The bottom surface 40 of sheet 32 has any suitable self-pressure sensitive adhesive 42 applied thereto. Adhesive 42 is protected by the utilization of any conventional protective covering 44 in the form of, for example, a strip of thin plastic which can be removed prior to the use of indicator 30.

Sheet 30 is configured in any suitable design. If, for example, indicator 30 is to be utilized in the same manner as indicator 10 it may be formed in the shape of an arrow or any other configuration indicative of direction. Indicator 30 is utilized in substantially the same manner and under the same circumstances as phorphorescent indicator 10. Therefore a further detailed explanation of its use is unnecessary.

FIGS. 5 and 6 of the drawings illustrate another embodiment of this invention in which a phosphorescent indicator 50 is made as an individual element rather than in the form of a tape of indefinite length as with indicator 10. The actual makeup of each indicator 50, however, is similar to the makeup of indicator 10 in that indicia 52 projects from the surface 54 of a sheet 56 of material from which indicator 50 is produced. In a manner similar to the construction of phosphorescent indicator 10, indicator 50 utilizes a phosphorescent substance 58 applied to the undersurface 60 of indicia 52. The adhesive 62 is only applied to the undersurface 64 of sheet 56 which does not incorporate indicia 52 therein.

For purposes if illustration, indicia 52 takes the form of an arrowhead, however, any other suitable configuration within the scope of this invention concept may be utilized in place thereof. As stated hereinabove, since the application of phosphorescent indicator 50 is identical to the usage of indicators 10 and 30 a detailed description of this use need not be repeated herein.

Figure 8:
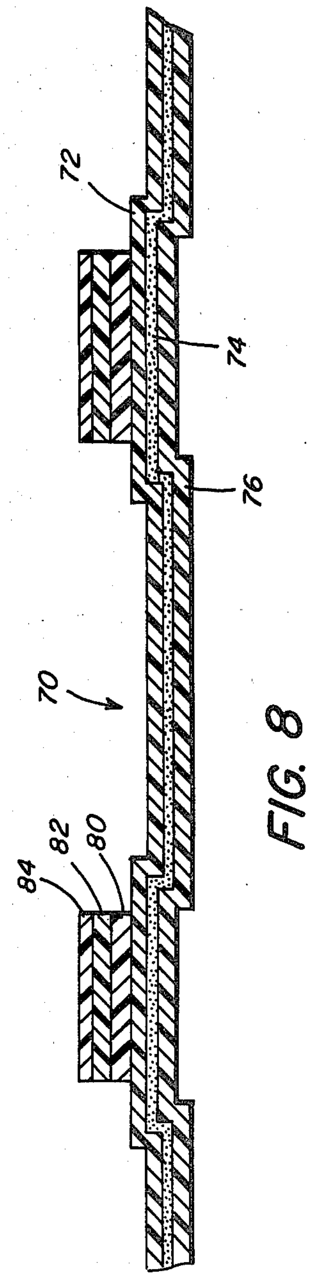
FIG. 8 is a cross-sectional view of the alternate embodiment of the phosphorescent escape route indicator of this invention taken along line VII—VII of FIG. 7.
Figure 7:
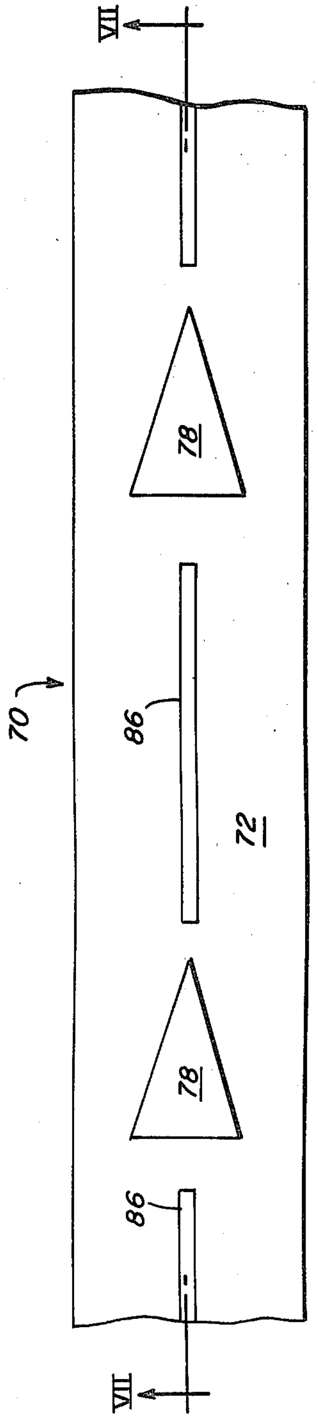
FIG. 7 is a plan view of still another alternate embodiment of the phosphorescent escape route indicator of this invention.

In still a further embodiment in FIGS. 7–8 of the invention the phosphorescent indicator 70 comprises an elongated strip of plastic material 72 having a pressure sensitive adhesive 74 on its bottom surface, a protective covering 76, such as a strip of thin plastic, which is removed prior to use underneath the adhesive 74, and a plurality of triangularly shaped plastic indicia 78 attached to its top surface such as by welding, each one of said plastic indicia 78 comprising a layer of reflective (white) plastic material 80, a layer of a phosphorescent substance 82 on top of the layer of reflective plastic material 80 and a layer of transparent (clear) plastic material 84 on top of the layer of phosphorescent substance 82 and which serves as a protective coating for the layer of phosphorescent substance 82. Phosphorescent indicator 70 further includes embossed areas 86 on strip 72 extending between one plastic indicias 78 which serve as "feeler" lines for enabling a person to feel his way from one plastic indicia to the next.

It is therefore readily apparent from the above description of this invention that this invention provides a novel phosphorescent indicator which is extremely useful in both emergency and nonemergency applications. In addition, the indicators depicted by the various embodiments of this invention are also easy to use, extremely durable and well within established criteria of cost effectiveness.

Although this invention has been described with reference to particular embodiments, it will be understood that this invention is also capable of further and other embodiments within the spirit and scope of the appended claims.

What is claimed is:

1. A direction indicating tape capable of providing a visual and feelable indication of direction during periods of darkness comprising:

(a) an elongated strip of material, capable of being wound in a roll, (b) adhesive means on the bottom side of said strip of material for securing said strip to a wall surface and spaced a predetermined distance from the floor, (c) and a plurality of spaced phosphorescent, pointed shaped, indicator elements attached to a top side of said sheet along its length, each phosphorescent indicator element having a thickness sufficient to be felt and comprising:

1. a layer of reflective plastic material, 2. a layer of a phosphorescent substance on top of said layer of reflective material, and
3. a layer of clear plastic material on top of said layer of phosphorescent substance, and elongated line-like embossed areas on said strip of material extending between said phosphorescent indicators for enabling a person to feel his way from one indicator element to the next.

2. An indicator tape as defined in claim 1 wherein said indicator elements are each in the shape of an arrow.

3. The direction indicating tape of claim 1 and further including a removable plastic cover on the bottom of said adhesive means.

4. The direction indicating tape of claim 1 and wherein said strip of material is plastic and said indicator elements are plastic.

* * * * *